US008397511B2

(12) United States Patent
Chen et al.

(10) Patent No.: US 8,397,511 B2
(45) Date of Patent: Mar. 19, 2013

(54) SYSTEM AND METHOD FOR COOLING A WALL OF A GAS TURBINE COMBUSTOR

(75) Inventors: Wei Chen, Greer, SC (US); Jesse Edwin Trout, Simpsonville, SC (US); Jeffrey Lebegue, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 959 days.

(21) Appl. No.: 12/468,724

(22) Filed: May 19, 2009

(65) Prior Publication Data
US 2010/0293957 A1 Nov. 25, 2010

(51) Int. Cl.
*F02C 1/00* (2006.01)
(52) U.S. Cl. .......................................................... 60/752
(58) Field of Classification Search ................ 60/39.37, 60/752–760; 415/177
See application file for complete search history.

(56) References Cited

U.S. PATENT DOCUMENTS

| | | | | |
|---|---|---|---|---|
| 3,851,465 A * | 12/1974 | Verdouw | ......................... | 60/804 |
| 3,899,882 A * | 8/1975 | Parker | ............................. | 60/752 |
| 3,981,142 A * | 9/1976 | Irwin | .............................. | 60/753 |
| 5,220,795 A | 6/1993 | Dodds et al. | | |
| 5,687,572 A * | 11/1997 | Schrantz et al. | ................ | 60/753 |
| 6,250,082 B1 * | 6/2001 | Hagle et al. | .................... | 60/753 |
| 6,408,629 B1 * | 6/2002 | Harris et al. | .................... | 60/804 |
| 6,749,396 B2 * | 6/2004 | Barry et al. | .................... | 415/115 |
| 7,364,807 B2 * | 4/2008 | Boutwell et al. | .............. | 428/701 |
| 7,373,772 B2 * | 5/2008 | Simons et al. | ............... | 60/39.37 |
| 7,677,045 B2 * | 3/2010 | Jorgensen et al. | ............. | 60/752 |
| 2009/0120095 A1 * | 5/2009 | Berry et al. | .................... | 60/754 |

* cited by examiner

*Primary Examiner* — Phutthiwat Wongwian
(74) *Attorney, Agent, or Firm* — Fletcher Yoder P.C.

(57) ABSTRACT

A system, in one embodiment, includes an engine wall. The engine wall includes a cold-side and a hot-side. The engine wall includes one or more dilution holes, wherein each of the one or more dilution holes includes a first opening on the cold-side, a second opening on a hot-side, and a section of thermal barrier coating (TBC) applied on the cold-side and having an opening that generally circumscribes the first opening.

19 Claims, 8 Drawing Sheets

US 8,397,511 B2

SYSTEM AND METHOD FOR COOLING A WALL OF A GAS TURBINE COMBUSTOR

BACKGROUND OF THE INVENTION

The subject matter disclosed herein relates generally to gas turbine engines and, more specifically, to systems for cooling a wall of a gas turbine combustor.

A gas turbine engine includes a compressor, a combustor, and a turbine. The combustor is configured to combust a mixture of fuel and compressed air to generate hot combustion gases, which in turn drive blades of the turbine. The combustion generates a significant amount of heat along walls of the combustor, the turbine, and other components. Thus, the gas turbine engine typically includes one or more coolant flows to dissipate heat. For example, air from the compressor is often used both for cooling and combustion with the fuel. Unfortunately, a high thermal gradient may develop in certain areas due to the temperature difference between the hot combustion gases and the coolant flows. In turn, the high thermal gradient can lead to thermal stress cracks, leakage, and other problems. These problems, among others, may negatively impact the performance, reliability, and/or life of turbine components.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system including a turbine engine is provided. The turbine engine includes a transition section having a generally annular transition piece. The transition piece includes a plurality of dilution extending radially through the transition piece with respect to a longitudinal axis of the transition piece. Each of the plurality of dilution holes includes an entry-side opening on a cold-side of the transition piece, an exit-side opening on a hot-side of the transition piece, and a section of thermal barrier coating (TBC) applied on the cold-side and generally circumscribing the entry-side opening.

In another embodiment, a system including a combustor wall is provided. The combustor wall includes a cold-side and a hot-side. The combustor wall additionally includes a plurality of dilution holes passing through the combustor wall. Each dilution hole includes an entry-side opening on the cold-side and an exit-side opening on the hot-side. Each dilution hole further includes a chamfer about the entry-side opening. Finally, each dilution hole includes a discrete thermal barrier coating (TBC) applied on the cold-side.

In yet another embodiment, a system includes an engine wall. The engine wall includes a cold-side and a hot-side. The engine wall further includes one or more dilution holes, wherein each of the one or more dilution holes includes a first opening on the cold-side, a second opening on a hot-side, and a section of thermal barrier coating (TBC) applied on the cold-side and having an opening that generally circumscribes the first opening.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
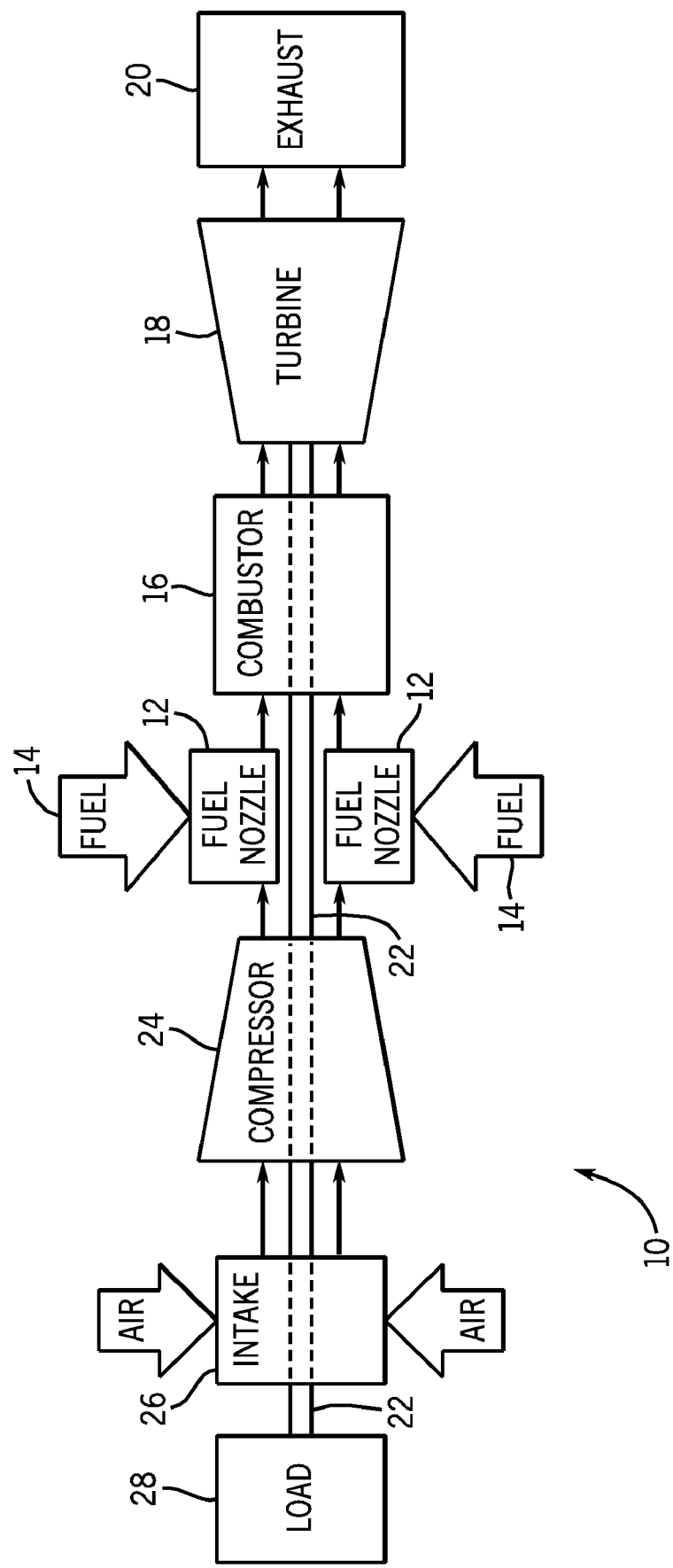
FIG. 1 is a block diagram of a turbine system that includes a combustor section having a transition piece with enhanced thermal characteristics, in accordance with an embodiment of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Further, any examples of operating parameters and/or environmental conditions are not exclusive of other parameters/conditions of the disclosed embodiments. Additionally, it should be understood that references to "one embodiment" or "an embodiment" of the present invention are not intended to be interpreted as excluding the existence of additional embodiments that also incorporate the recited features.

The present disclosure is directed to a turbine combustor including a transition piece capable of providing for improved thermal performance during operation of a turbine engine. Before continuing, several terms used extensively throughout the present disclosure will be first defined in order to provide a better understanding of the claimed subject matter. As used herein, the terms "upstream" and "downstream," shall be understood to generally refer to directions relative to the flow of combustion gases inside the combustor. That is, unless otherwise indicated, the term "downstream" may refer to the direction in which a fuel-air mixture combusts and flows away from fuel nozzles of the combustor and towards a turbine. Similarly, the term "upstream," unless otherwise indicated, shall be understood to refer to the direction opposite the above-defined "downstream" direction. Further, as mentioned above, during operation of a gas turbine engine, the inner surfaces of a combustor liner wall and a downstream transition piece wall generally becomes substantially hotter relative to their respective outer surfaces due to the flow of hot combustion gases along the inner surfaces of these components. As used herein the term "hot-side" or the like shall be understood to refer to an inner surface (e.g., surface that is directly contacted by hot combustion gases during turbine operation), and the term "cold-side" or the like shall be understood to refer to an outer surface (e.g., surface of that is not directly contacted by hot combustion gases during turbine operation) when used in relation to a transition piece or combustor liner.

Additionally, as will be discussed below, a transition piece, which may also be referred to as a "transition section" or "transition duct", in accordance with embodiments of the present invention, may include dilution holes treated with a thermal barrier coating (TBC) on the cold-side and/or hot-side of the transition piece to enhance thermal characteristics of the transition piece. Thus, the term "TBC dilution hole," "TBC hole," or the like, shall be understood to refer to a dilution hole that has been treated with a TBC, as will be described in further detail below. Further, when described with respect to the introduction of a flow of dilution air through the TBC dilution holes and into the transition piece cavity and/or combustion chamber, the cold-side opening of the TBC dilution hole (e.g., the opening on the outer surface) may also be referred to as an "entry-side," and the hot-side opening on the TBC dilution hole (e.g., the opening on the inner surface) may also be referred to as an "exit-side."

In certain embodiments, as will be discussed further below, a transition piece of a turbine engine may include a plurality of TBC dilution holes. The TBC dilution holes may be arranged circumferentially and/or axially along the transition piece and may extend radially (with respect to a longitudinal axis of the transition piece) through the transition piece wall to provide a path for dilution air to flow into the transition piece cavity. In one embodiment, the TBC dilution holes may be treated to include a section of TBC on the cold-side of the transition piece that generally circumscribes the entry-side opening of the dilution hole. In some embodiments, the cold-side TBC may be used in conjunction with another TBC applied on the hot-side of the transition piece. In operation, the application of a TBC around the entry-side opening of the dilution hole may reduce the temperature difference between the hot-side and cold-side of the transition piece wall. In this manner, embodiments of the present invention may reduce thermal oscillation and the temperature gradient across the transition piece wall, thereby reducing the thermal and/or tensile stresses experienced by the transition piece during operation of the turbine engine. For instance, by reducing the thermal and tensile stress experienced by the transition piece, the occurrence of cracking in the transition piece walls (particularly in regions near the dilution holes) and/or hot gas flush from the hot-side to the cold-side may be substantially reduced or avoided altogether. As will be appreciated, the foregoing advantages, among others, may improve the performance, reliability, and life of turbine engine components.

Turning now to the drawings and referring first to FIG. 1, a block diagram of an embodiment of a turbine system 10 is illustrated. As will be discussed in detail below, the disclosed turbine system 10 may employ a transition piece having TBC dilution holes that provide for improved thermal characteristics during turbine operation. The turbine system 10 may use liquid or gas fuel, such as natural gas and/or a hydrogen rich synthetic gas, to run the turbine system 10. As depicted, a plurality of fuel nozzles 12 intakes a fuel supply 14, mixes the fuel with air, and distributes the air-fuel mixture into a combustor 16. The air-fuel mixture combusts in a chamber within combustor 16, thereby creating hot pressurized exhaust gases. The combustor 16 directs the exhaust gases through a turbine 18 toward an exhaust outlet 20. As the exhaust gases pass through the turbine 18, the gases force one or more turbine blades to rotate a shaft 22 along an axis of the system 10. As illustrated, the shaft 22 may be connected to various components of turbine system 10, including a compressor 24. The compressor 24 also includes blades that may be coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. As will be understood, the load 28 may include any suitable device that is capable of being powered by the rotational output of turbine system 10.

Figure 2:
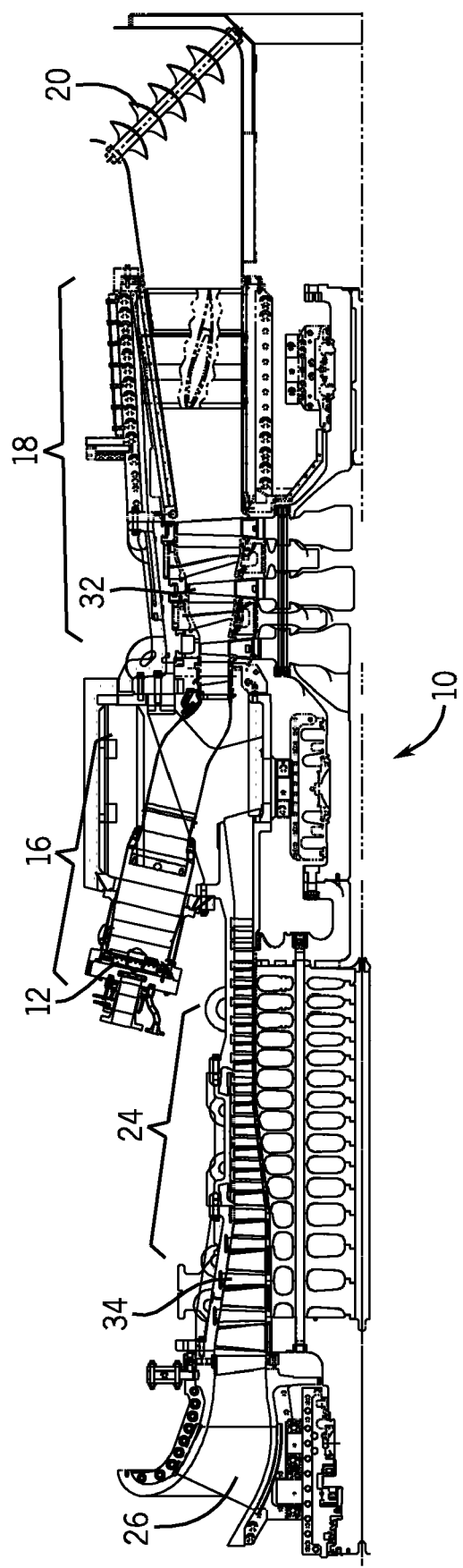
FIG. 2 is a cutaway side view of the turbine system shown in FIG. 1, in accordance with an embodiment of the present technique.

FIG. 2 illustrates a cutaway side view of an embodiment of the turbine system 10 schematically depicted in FIG. 1. The turbine system 10 includes one or more fuel nozzles 12 located inside one or more combustors 16. A combustor 16 may include one or more combustor liners disposed within one or more respective flow sleeves. A transition piece may be coupled downstream from the liner and may provide a path through which combustion gases may flow into the turbine 18. As mentioned above, the transition piece may, in accordance with embodiments of the present invention, be perforated with a plurality of TBC dilution holes to provide for enhanced thermal performance of the combustor 16. As will be discussed further below, each of the TBC dilution holes may be treated to include a section of TBC on the cold-side of the transition piece that generally circumscribes the entry-side opening of the dilution hole.

In operation, air is received by the turbine system 10 through the air intake 26 and may be pressurized in the compressor 24. The compressed air may then be mixed with fuel 14 for combustion within the combustor 16. For example, the fuel nozzles 12 may inject a fuel-air mixture into the combustor 16 in a suitable ratio for optimal combustion, emissions, fuel consumption, and power output. The combustion generates hot pressurized exhaust gases, which then drive one or more blades 32 within the turbine 18 to rotate the shaft 22 and, thus, the compressor 24 and the load 28. The rotation of the turbine blades 32 causes a rotation of shaft the 22, thereby causing blades 34 within the compressor 22 to draw in and pressurize the air received by the intake 26.

Figure 3:
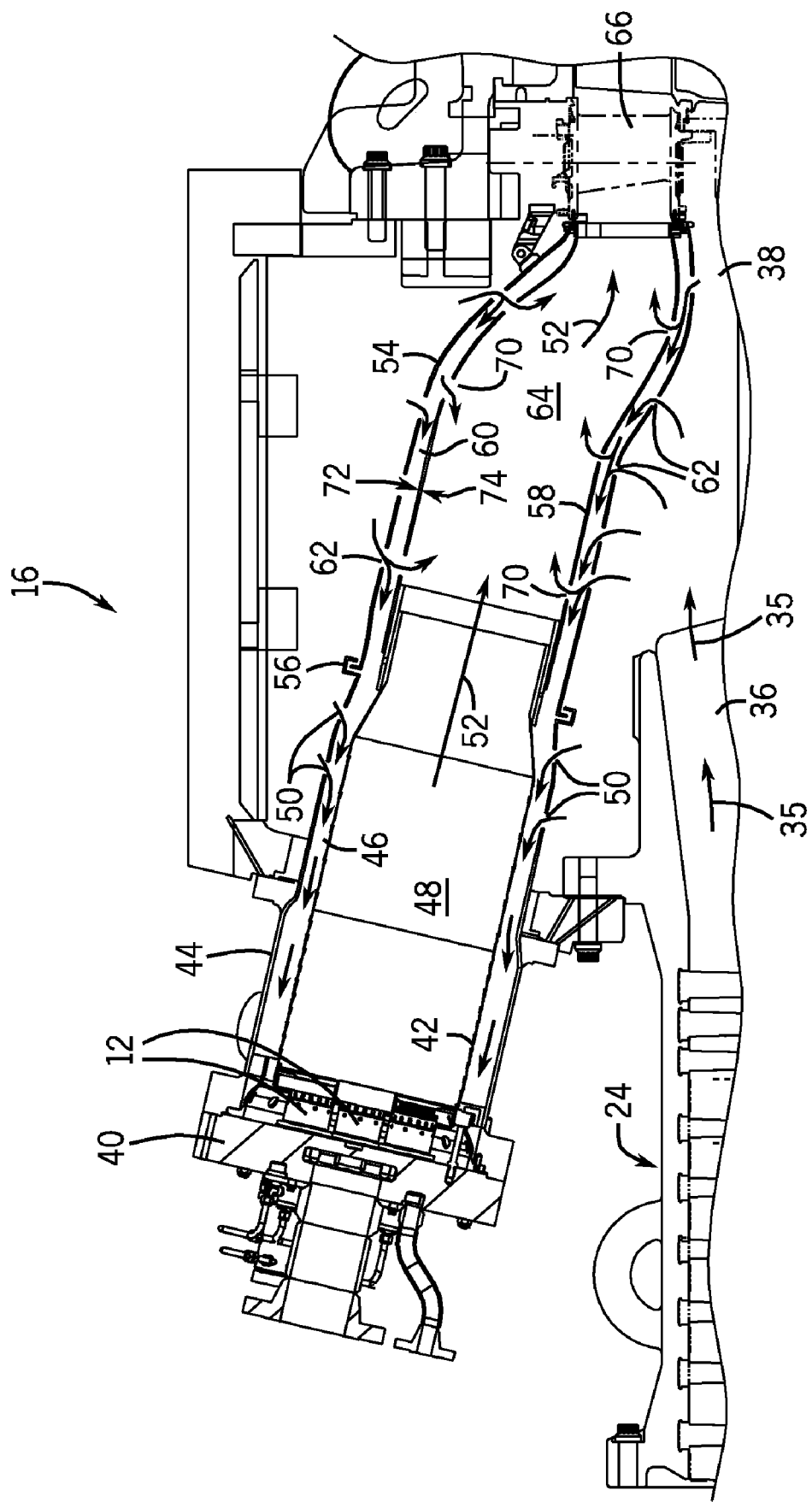
FIG. 3 is a cutaway side view of a combustor, as shown in FIG. 2, that includes a transition piece having dilution holes treated with a thermal barrier coating (TBC), in accordance with an embodiment of the present technique.

Continuing now to FIG. 3, a more detailed cutaway side view of an embodiment of the combustor 16, as shown FIG. 2, is illustrated. The combustor 16 is generally fluidly coupled to the compressor 24 and the turbine 18. The compressor 24 may include a diffuser 36 and a discharge plenum 38 that are coupled to each other in fluid communication as to facilitate the channeling of air downstream (arrows 35) to the combustor 16. In the illustrated embodiment, the combustor 16 includes a cover plate 40 at the upstream head end of the combustor 16. The cover plate 40 may at least partially support the fuel nozzles 12 and may further provide a path through which air and fuel are directed to the fuel nozzles 12.

As shown, combustor 16 includes a hollow annular wall configured to receive compressor air from the plenum 38. For example, the combustor 16 includes a combustor liner 42 disposed within a flow sleeve 44. The arrangement of the liner 42 and the flow sleeve 44, as shown in FIG. 3, is generally concentric and may define an annular passage 46. In certain embodiments, the flow sleeve 44 and the liner 42 may define a first or upstream hollow annular wall of the combustor 16. The interior of the liner 42 may define a substantially cylindrical or annular combustion chamber 48. The flow sleeve 44 may additionally include a plurality of inlets 50, which provide a flow path for at least a portion of the air from the compressor 24 into the annular passage 46. In other words, the flow sleeve 44 may be perforated with a pattern of openings to define a perforated annular wall. Downstream from the combustor liner 42 and the flow sleeve 44 (e.g. in the direction 52), a second flow sleeve 54 (also referred to as an "impingement sleeve") may be coupled to the flow sleeve 44. Thus, the direction 52 may represent a downstream direction with respect to the flow of combustion gases away from the fuel nozzles 12 and through the combustor liner 42 and a transition piece 58.

As shown in the illustrated embodiment, the flow sleeve 44 may include a mounting flange 56 configured to receive a portion of the impingement sleeve 54. The transition piece 58 may be disposed within the impingement sleeve 54, and may be coupled to the downstream end of the liner 42 by way of a coupling member (e.g., a flange), a sealing member, or some combination thereof. A concentric arrangement of the impingement sleeve 54 and the transition piece 58 may define an annular passage 60. As shown, the annular passage 60 is fluidly coupled to the annular passage 46. In certain embodiments, the impingement sleeve 54 and the transition piece 58 may define a second or downstream hollow annular wall of the combustor 16. The impingement sleeve 54 may include a plurality of inlets 62 (e.g., perforated annular wall), which may provide a flow path for at least a portion of the air from the compressor 24 into the annular passage 60. Thus, together, the elements 42, 44, 54, and 58 define a hollow annular wall (e.g., upstream and downstream portions) configured to facilitate air flow to the fuel nozzles 12. Additionally, the air flow being supplied to the fuel nozzles 12 may also provide some degree of cooling to the combustor 16 with regard to the heat generated from combustion. An interior cavity 64 of the transition piece 58 generally provides a path by which combustion gases from the combustion chamber 48 may be directed through a turbine nozzle 66 and into the turbine 18.

As discussed above, the turbine system 10, in operation, intakes air through the air intake 26. The compressor 24, which is driven by the shaft 22, rotates and compresses the air, and the compressed air is discharged into the diffuser 36, as indicated by the arrows 35 shown in FIG. 3. The majority of the compressed air is further discharged from the compressor 24, by way of the diffuser 36, through a plenum 38 into the combustor 16. Though not shown in detail here, a smaller portion of the compressed air may be channeled downstream for cooling of other components of the turbine engine 10. A portion of the compressed air within the plenum 38 may enter the annular passage 60 by way of the inlets 62. The air entering the annular passage 60 is then channeled upstream (e.g., in the direction of fuel nozzles 12) towards the annular passage 46, which is fluidly coupled to the annular passage 60. That is, a flow path in the upstream direction (relative to direction 52) is defined by the annular passages 46 (formed by sleeve 44 and liner 42) and 60 (formed by sleeve 54 and transition piece 58). Thus, the compressor air entering the annular passage 60 may continue to flow upstream into the annular passage 46 and towards the cover plate 40 and fuel nozzles 12. At the same time, a portion of the compressed air from the plenum 38 may also enter the annular passage 46 by way of the inlets 50. In other words, the annular passage 46 may receive an upstream air flow contribution from both the annular passage 60 and the inlets 50. Air received by the fuel nozzles 12 is then mixed with fuel 14 and ignited within the combustion chamber 48. The resulting combustion gases are then channeled downstream (away from fuel nozzles 12) through the combustion chamber 48 and the transition piece cavity 64, and out through the turbine nozzle 66 to the turbine 18 (FIG. 2), as indicated by arrows 52.

As discussed above, certain embodiments of the invention may further provide for a flow of dilution air into the transition piece cavity 64. For instance, as illustrated in FIG. 3, the transition piece 58 may also be perforated with a plurality of TBC dilution holes 70. In the illustrated embodiment, the dilution air provided via the TBC dilution holes 70 may be a portion of the compressor air received in the annular passage 60 (through inlets 62 on impingement sleeve 54). As will be appreciated, dilution air may be utilized to facilitate cooling and/or heat absorption, to manipulate and/or control the profile of exhaust gases, to improve combustion efficiency, to control emission characteristics, or some combination thereof. For instance, in some turbine applications, emissions resulting from the combustion process may include nitrogen-based oxide compounds ($NO_x$), carbon monoxides, and unburned hydrocarbons. The oxidation of nitrogen is generally influenced by the temperature of the combustion gases produced in the combustor 16. By decreasing the temperature within the combustor 16, the formation of $NO_x$ may be reduced. Thus, in one application, dilution air may be supplied into the transition piece cavity 64 by way of the TBC dilution holes 70 to provide cooling and, thus, reduce the temperature of the combustion gases to a level at which $NO_x$ formation is substantially reduced or eliminated.

As will be further appreciated, the temperature of the combustion gases flowing through the combustion chamber 48 and cavity 64 is generally substantially hotter relative to the temperature of the compressor air flowing through the annular passages 46 and 60. By way of example only, the temperature of the compressor air (received via inlets 50 and 60) flowing upstream (towards the fuel nozzles 12) through annular passages 46 and 60 along a cold-side 72 of the transition piece 58 may be approximately 100 to 1000 degrees Fahrenheit, whereas the temperature of the combustion gases flowing downstream (away from fuel nozzles 12) through the transition piece cavity 64 along a hot-side 74 of the transition piece 58 may be approximately 2000 to 3500 degrees Fahrenheit. In other words, the temperature difference between the hot-side 74 and the cold-side 72 may be at least greater than 1000, 1500, or 2000 degrees Fahrenheit. Thus, the temperature ratio of the hot-side 74 versus the cold-side 72 may be at least greater than 2, 3, 4, 5, 6, 7, 8, 9, or 10. Further, the foregoing temperatures ranges, differences, and ratios of the combustion gases and compressor air are provided only by way of example and, in additional embodiments, the temperature of the combustion gases and compressor air may be greater or less than the specific examples provided above. Thus, conventional turbine systems may experience a substantially large temperature gradient between the cold-side 72 and hot-side 74 of the transition piece 58. In accordance with embodiments of the present invention, each of the dilution holes 70 may be treated to include a section of TBC on the cold-side 72 of the transition piece 58 generally circumscribing the entry-side opening of a respective dilution hole 70. As will be discussed further below, the application of TBC to the cold-side 72 of the transition piece 58 and around the entry-side openings of the dilution holes 70 may reduce the thermal and/or tensile stresses otherwise experienced by the transition piece 58 and, therefore, improve turbine operation and performance.

Figure 4:
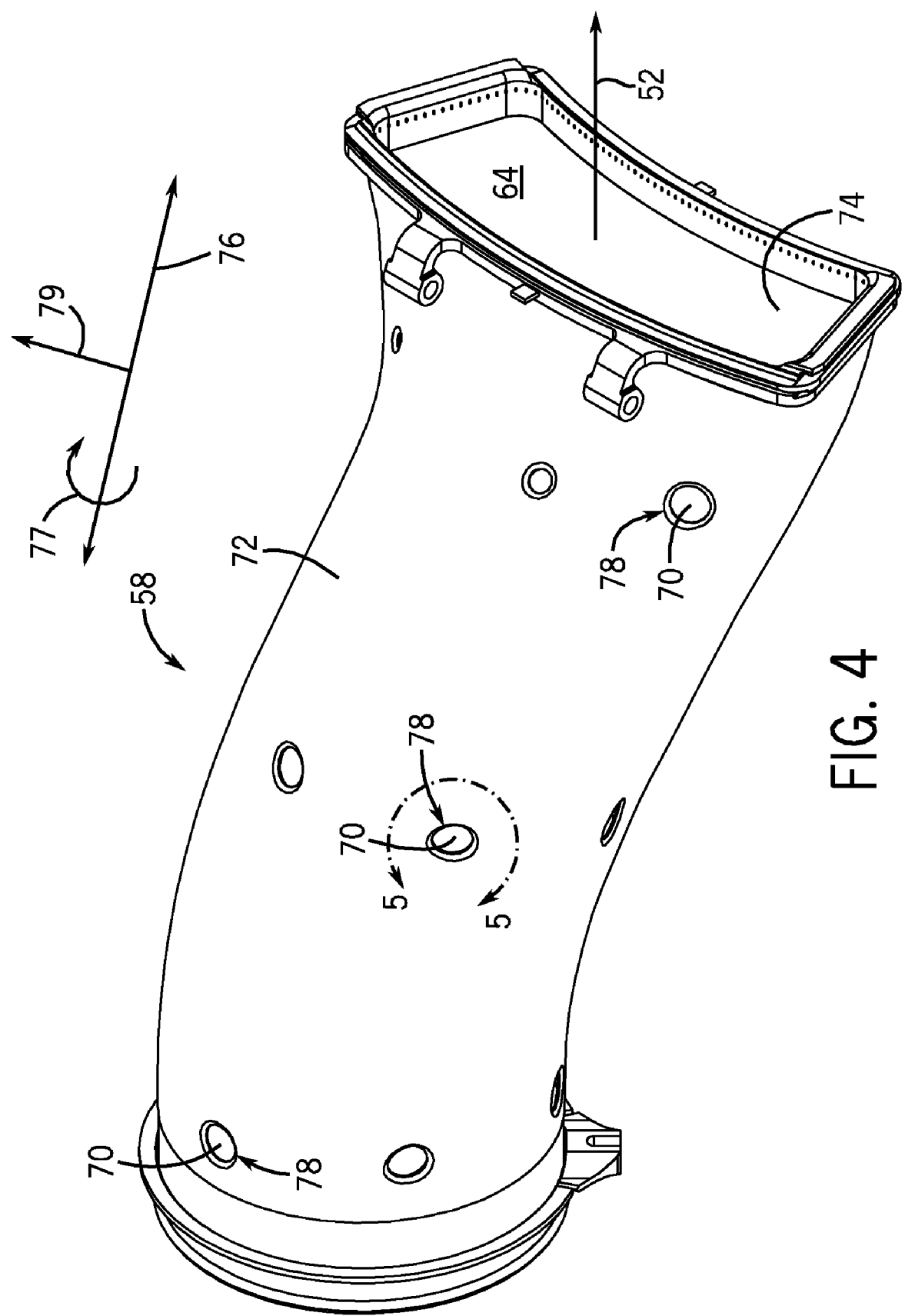
FIG. 4 is a perspective view of the transition piece of FIG. 3, in accordance with an embodiment of the present technique.

Referring now to FIG. 4, a perspective view showing an embodiment of the transition piece 58 is illustrated. In the illustrated embodiment, the transition piece 58 may include a plurality of TBC dilution holes 70 arranged both axially (direction 76) and circumferentially (direction 77) with respect to a longitudinal axis 76 of the transition piece 58, as shown by the illustrated reference axes. Each TBC dilution hole 70 may extend radially (along axis 79) through the transition piece 58 and may be defined by a first opening (entry-side opening) on the cold-side 72 and a second opening (exit-side opening) on the hot-side 74 of the transition piece 58. As mentioned above, each TBC dilution hole 70 may be treated to include a section of TBC 78 on the cold-side 72 that generally circumscribes the entry-side opening of the dilution hole 70. The application of the TBC 78 in this manner may reduce the thermal gradient between the cold-side 72 and the hot-side 74 of the transition piece 58, thereby reducing thermal and/or tensile stresses experienced by the transition piece 58 during operation of the turbine engine 10. In other words, the transition piece 58 may include a pattern of TBC sections 78 that coincide with the dilution holes 70. The pattern of TBC sections 78 may be discrete or continuous, with the understanding that the pattern of TBC sections 78 generally does not cover the entire cold-side 72 of the transition piece 58. Additionally, while the illustrated embodiment depicts TBC dilution holes 70 being arranged in a generally linear fashion in both axial and circumferential directions, it should be understood that the TBC dilution holes 70, in other embodiments, may be arranged in any suitable matter. For instance, the TBC dilution holes 70 may be arranged generally linearly in only the axial direction 76, or may be arranged generally linearly in only the circumferential direction 77. The TBC dilution holes 70 may also be arranged in a non-linear manner in one or both of the axial 76 or circumferential 77 directions. Additionally, it should be appreciated that the TBC dilution holes 70 may have a constant size or may vary in size. For instance, the TBC dilution holes 70 may circumferentially and/or axially alternate between holes of a first diameter and holes of a second diameter. Various embodiments of the TBC dilution holes 70 will be further described with respect to FIGS. 5-11.

Figure 5:
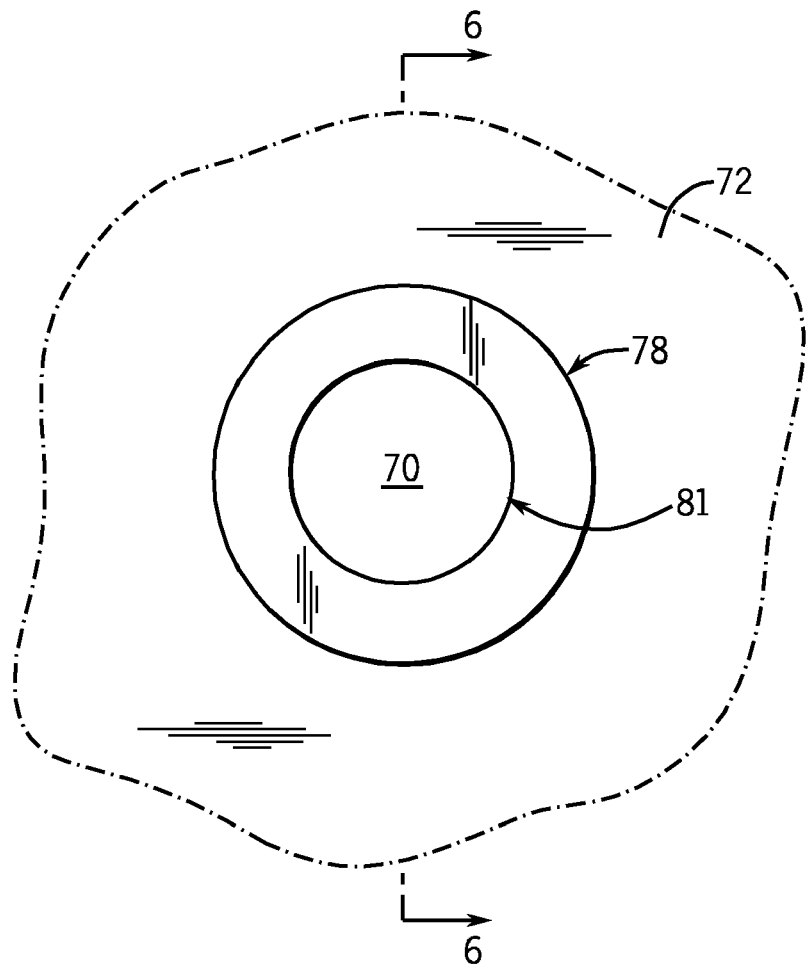
FIG. 5 is a partial top view of a portion of the outer surface of the transition piece taken within arcuate line 5-5 of FIG. 4 illustrating a TBC-treated dilution hole, in accordance with an embodiment of the present technique.

Continuing to FIG. 5, a partial top view of the cold-side 72 of the transition piece 58 within the circular region defined by the arcuate line 5-5, as shown in FIG. 4, is illustrated. The illustrated portion of the transition piece 58 includes a generally circular-shaped dilution hole 70 that extends radially (axis 79) through the transition piece wall. As shown in FIG. 5, the dilution hole 70 may include a section of TBC 78 applied to the cold-side 72 of the transition piece 58, such that the TBC 78 is generally circular and includes an opening that generally circumscribes the entry-side opening 81 of the dilution hole 70. While the presently illustrated embodiment depicts a generally circular hole 70, it should be appreciated that any suitable geometric configuration of the dilution hole 70 and its corresponding TBC 78 may be utilized. For instance, in other embodiments, the dilution hole 70 and or the TBC 78 may be square-shaped, rectangular-shaped, oval-shaped, triangle-shaped, and so forth. Indeed, any suitable combination of geometries may be employed with respect to the dilution hole 70 and TBC 78, with the understanding that the TBC 78 may be applied on the cold-side 72 to generally circumscribe the entry-side opening 81 of the dilution hole 70 regardless of the particular hole geometry used.

As can be appreciated, the cooling airflow passing through each dilution hole 70 transfers heat away from the transition piece 58 with greatest effectiveness in the vicinity of each dilution hole 70. Specifically, the dilution hole 70 adds more surface area (e.g., inner surface of the hole 70) for the cooling airflow to convectively cool the transition piece 58 As a result, the cooling airflow provides greater forced convective cooling in the vicinity of each dilution hole 70 as compared to areas without dilution holes 70. Unfortunately, without the TBC 78, this increased cooling via airflow through each dilution hole 70 creates a greater thermal gradient in the vicinity of each dilution hole 70. In the present embodiments, the TBC 78 is configured to at least partially thermally insulate and reduce convective cooling by the cooling airflow in the vicinity of each dilution hole 70. In other words, the size, thickness, surface area, material composition, and general characteristics of the TBC 78 may be selected to reduce the increased convective cooling caused by the cooling airflow passing through each dilution hole 70, thereby providing a more uniform temperature distribution in the vicinity of each dilution hole 70. For example, if the cooling airflow through each dilution hole 70 changes the temperature profile about the dilution hole 70 by a certain percentage as a function of depth and distance from the dilution hole 70, then the dilution hole 70 may be surrounded with the TBC 78 of a certain thickness and coverage area to counteract this change in the temperature profile.

Figure 6:
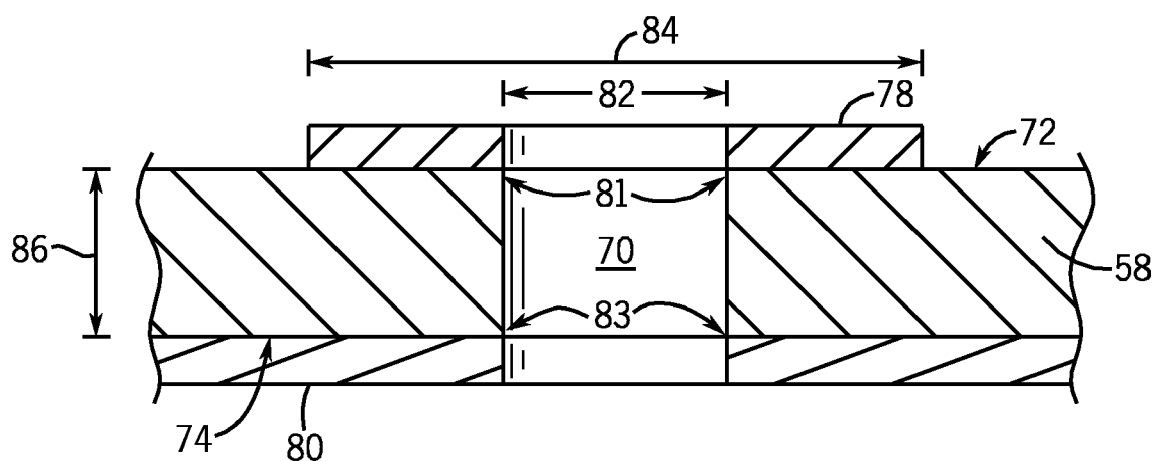
FIG. 6 is a cross-sectional view of the dilution hole taken along cut-line 6-6 of FIG. 5, in accordance with one embodiment of the present technique.

The illustrated TBC dilution hole 70 of FIG. 5 may be better understood with reference to FIG. 6, which shows a cross-sectional view of the dilution hole 70 taken along cut-line 6-6 of FIG. 5. As shown, the section of TBC 78 is formed on the cold-side 72 of the transition piece 58, such that the TBC 78 generally circumscribes the entry-side opening 81 of the dilution hole 70. As discussed above, the application of the TBC 78 may help reduce the temperature gradient between the cold-side 72 and the hot-side 74 of the transition piece 58, particularly in the general proximity of the dilution holes 70, and may improve turbine performance, such as by reducing thermal and/or tensile stresses experienced by the transition piece 58 during operation. In the illustrated embodiment, the hot-side 74 of the transition piece may be coated with another TBC 80. For example, the TBC 80 may be applied generally to the entire hot-side 74 of the transition piece 58, or only a portion of the hot-side 74. As will be appreciated, the combination of the TBC 80 on the hot-side 74 and the TBC 78 on the cold-side 72 may further reduce the temperature gradient in the transition piece 58, and may thus further improve turbine performance. While the depicted embodiment shows the dilution hole 70 including a cold-side TBC 78 and a hot-side TBC 80, it should be understood that various other embodiments of the transition piece 58 may include the TBC 78 without the TBC 80, or the TBC 80 without the TBC 78. In other words, embodiments of the transition piece 58 may include only the TBC 78, only the TBC 80, or a combination of both the TBC 78 and the TBC 80 on the entry-side 81 and an exit-side 83, respectively, of the dilution hole 70.

As will be further appreciated, the dimensions of the dilution hole 70, TBC 78, and TBC 80 may vary depending on the particular thermal properties needed in a particular implementation. By way of example only, certain embodiments of the dilution hole 70 may have a diameter 82 of at least less than approximately 1 to 100 millimeters or, more specifically, 5 to 70 millimeters. It should be understood, however, that other embodiments of the dilution hole 70 may have a diameter of greater than 100 millimeters or less than 1 millimeter. The dilution hole 70 may be formed using any suitable technique, such as milling, casting, molding, or laser etching/cutting, for example. In some embodiments, the diameter 84 of the TBC section 78 may be proportional to the diameter 82 of the dilution hole 70. By way of example, the diameter 84 of the TBC section 78 may be approximately 1.5, 2, 2.5, 3, or 3.5 times the diameter 82 of the dilution hole 70. It should be understood that, in other embodiments, the diameter 84 of the TBC 78 may be less than 1.5 times or greater than 3.5 times the diameter 82 of the dilution hole 70. Further, the surface area of the TBC section 78 may be determined as a factor or a fraction of the entry-side opening surface area. For instance, the surface area of the TBC section may be at least less than approximately 0.25, 0.5, 0.75, 1, 1.5, 2, 2.5, 3, 4, or 5 times the surface area of the entry-side opening 81 of the dilution hole 70.

As also shown, the wall of transition piece 58 may have a thickness, indicated by reference number 86. In certain embodiments, the thickness 86 of the transition piece wall may be at least less than approximately 0.1 to 2 millimeters or, more specifically, 0.12 to 1.6 millimeters. Again, it should be understood that the thickness 86, in other embodiments, may also be less than 0.1 millimeters or greater than 2 millimeters. In the illustrated embodiment, the dilution hole 70 has a thickness that is equal to the thickness 86 of the transition piece wall. Further, the thickness of the TBC 78 and TBC 80 may also vary. For instance, in certain embodiments, the TBC 78 may have a thickness of at least less than approximately 0.01 to 2 millimeters or, more specifically, 0.025 to 1.6 millimeters. Similarly, the TBC 80 may have a thickness of at least less than approximately 0.01 to 2 millimeters or, more specifically, 0.025 to 1.6 millimeters. In other embodiments, however, the thickness of TBC 78 and/or the TBC 80 may be less than 0.01 millimeters or greater than 2 millimeters. Further, in some embodiments, the TBC 78 and TBC 80 may have the same thickness or may have different thicknesses. The thickness of the TBC 78 on the cold-side 72 may be uniform across all dilution holes 70, or may vary across the dilution holes 70. For instance, a first dilution hole 70 on the transition piece 58 may have a first thickness, and a second dilution hole 70 on the transition piece 58 may have a second thickness different from the first thickness.

By way of example only, presence of the TBC 78, in certain embodiments, may decrease the temperature gradient in the transition piece wall, particularly in the general vicinity of the dilution hole 70, by at least greater than approximately 200-500 degrees Fahrenheit. Thermal barrier coatings, such as TBCs 78 and 80, in addition to providing thermal protection and reduction of temperature gradients, may also provide corrosion protection and improve mechanical wearing resistance. TBC 78 and TBC 80 may be provided by a number of suitable materials. By way of example only, TBC 78 or 80 may include yttria-stabilized zirconia (YSC), platinum aluminide, or nickel-cobalt combined with a Cr—Al—Y material (wherein Cr is chromium, Al is aluminum, and Y is one of yttrium, zirconium, titanium, or hafnium). Additionally, the TBC 78 and/or TBC 80 may be formed from the same or from different materials. Further, the thermal barrier coatings may be applied using any suitable technique, including air plasma spray (APS), electron beam physical vapor deposition (EB-PVD), electrostatic spray-assisted vapor deposition (ES-AVD), or direct vapor deposition. Further, in some embodiments, the TBC 78 and/or TBC 80 may be a Super B type of TBC based upon a desired thermal conductivity for meeting a target equilibrium temperature gradient in the transition piece 58.

Figure 7:
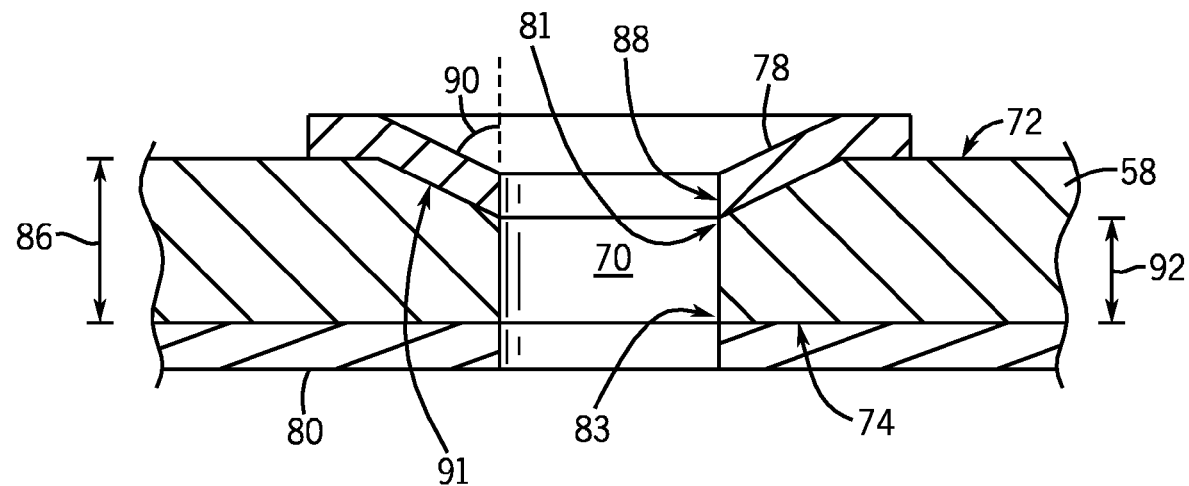
FIG. 7 is a cross-sectional view of the dilution hole taken along cut-line 6-6 of FIG. 5, in accordance with a further embodiment of the present technique.

Referring now to FIG. 7, a cross-sectional view of another embodiment of the dilution hole 70 taken along cut-line 6-6 of FIG. 5 is illustrated. The dilution hole 70 shown in FIG. 7 is similar to the embodiment described above with respect to FIG. 6, except that cold-side 72 of the transition piece 58 includes a generally conical-shaped chamfer 91 around the entry-side opening 81 of the dilution hole 70. The chamfered entry-side opening in FIG. 7 may offer improved flow dynamics compared to the non-chamfered embodiment shown in FIG. 6. For instance, the application of the chamfer may reduce boundary layer separation and keep the dilution air flow more attached to the transition piece wall as it flows along the cold-side 72 (e.g., in annular passage 60) through the entry-side opening 81 of the dilution hole 70 and into the transition piece cavity 64. The chamfer 91 may also reduce hot gas recirculation (e.g., via combustion gases in the interior of the transition piece 58) by reducing the temperature gradient across the hot-side 74 and the cold-side 72, and may thus further reduce the temperature of the transition piece wall near the dilution hole 70.

As shown, the chamfer 91 around the entry-side opening 81 of the dilution hole 70 may have an angle 90. In certain embodiments, the angle 90 may be at least less than approximately 15, 30, 45, 60, or 75 degrees. In other embodiments, the angle 90 may be less than 15 degrees or greater than 75 degrees. Further, as will be understood, due to the chamfer 91 on the entry-side opening 81, the thickness 92 (e.g., the vertical height) of the dilution hole 70 is less than the thickness 86 of the transition piece wall. In the illustrated embodiment, the TBC section 78 is applied over the entire chamfered portion on the cold-side 72 of the dilution hole 70. That is, the inside-edge 88 of the TBC section 78 is generally concentric and equally-sized with respect to the entry-side opening 81 of the dilution hole 70.

While the embodiment illustrated in FIG. 7 shows the inside-edge 88 of the TBC 78 as being generally concentric and equally-sized as the entry-side opening 81 of the dilution hole 70, other embodiments of the TBC 78 may include an inside-edge 88 that is not concentric and is differently-sized with respect to the entry-side opening 81 of the dilution hole 70. For instance, referring to FIG. 8, a cross-sectional view showing a further embodiment of the TBC dilution hole 70 taken along cut-line 6-6 of FIG. 5 is illustrated, wherein the TBC 78 is applied such that the inside-edge 88 is offset from the entry-side opening 81 of the dilution hole 70 by a "separation distance," referred to by reference number 96. In other words, the entry-side opening 81 and the inside-edge 88 may have different diameters. This results in a section 94 of the chamfered portion 91 on the cold-side 72 that is not coated by the TBC 78. In certain embodiments, the separation distance 96 may be at least less than approximately 0.01 to 0.3 millimeters or, more specifically, 0.02 to 0.26 millimeters. In other embodiments, the distance 96 may be less than 0.01 millimeters or greater than 0.3 millimeters. The diameter of the inside-edge 88 of the TBC section 78 may also be expressed as a function of the entry-side opening 81 diameter. For instance, the diameter of the inside-edge 88 may be 5, 10, 15, 20, 25, 30, 40, 50, 60, 70, 80, 90, or 100 percent greater than the diameter of the diameter of the entry-side opening 81. In the illustrated embodiment, the uncoated section 94 of the chamfer 91 may act as a turbulation element, and may further enhance flow dynamics by increasing surface contact between an air flow through the dilution hole 70 and the dilution hole wall (e.g., the wall defined between entry-side 81 and exit-side 83 openings). As will be appreciated, the separation distance 96 may be selected (e.g., depending on particular implementation needs) such that the temperature of the transition piece wall substantially minimizes thermal and/or tensile stress concentration in the general vicinity of the dilution hole 70.

Figure 9:
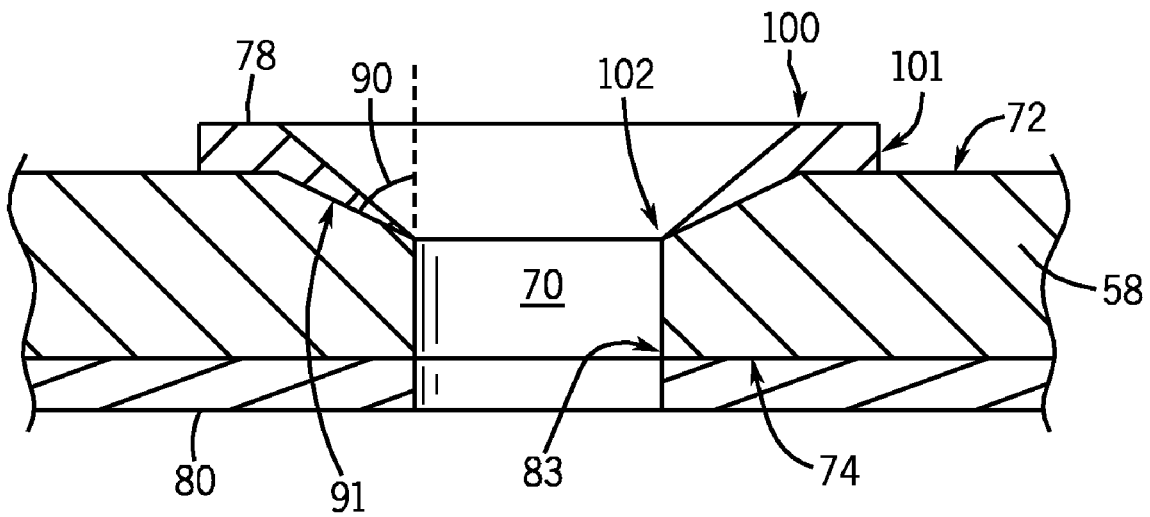
FIG. 9 is a cross-sectional view of the dilution hole taken along cut-line 6-6 of FIG. 5, in accordance with yet another embodiment of the present technique.

Continuing to FIG. 9, another cross-sectional view showing a further embodiment of the TBC dilution hole 70 along cut-line 6-6 of FIG. 5 is illustrated. The embodiment of FIG. 9 is similar to the embodiment of FIG. 6, except that the thickness of the TBC 78 on the cold-side varies (as opposed to having generally constant thickness in FIG. 6) as the TBC 78 extends outward from the entry-side opening 81 of the dilution hole. For instance, as illustrated, the thickness of the TBC 78 may be generally constant from the outermost edge 101 of the TBC 78 to the outermost edge of the chamfer 91, generally denoted by reference number 100. However, along the chamfered portion of the cold-side 72, the thickness of the TBC 78 may gradually decrease as the TBC 78 approaches the entry-side opening 81 of the dilution hole 70. That is, between the outermost edge 100 and an innermost edge 102 of the chamfer 91, the TBC 78 may have a conical tapered shape. As will be appreciated, by providing a varying thickness in the TBC 78, flow dynamics may be further improved and may help reduce boundary layer separation with respect to a dilution air flow. Also, the varying thickness of the TBC 78 may help to better achieve a particular temperature profile by providing less insulation near the hole 70 and more insulation away from the hole 70, thus resulting in more cooling closest to the hole 70.

Figure 8:
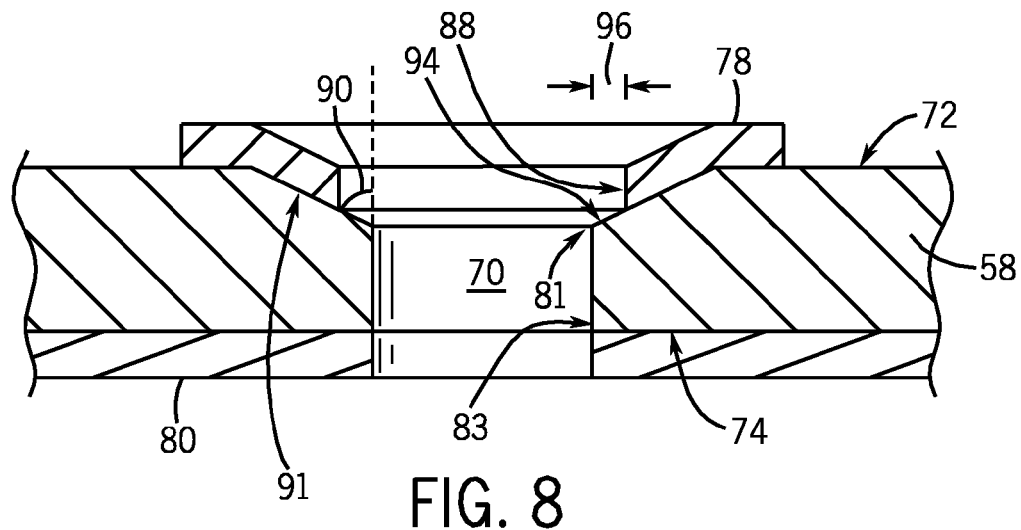
FIG. 8 is a cross-sectional view of the dilution hole taken along cut-line 6-6 of FIG. 5, in accordance with another embodiment of the present technique.
Figure 10:
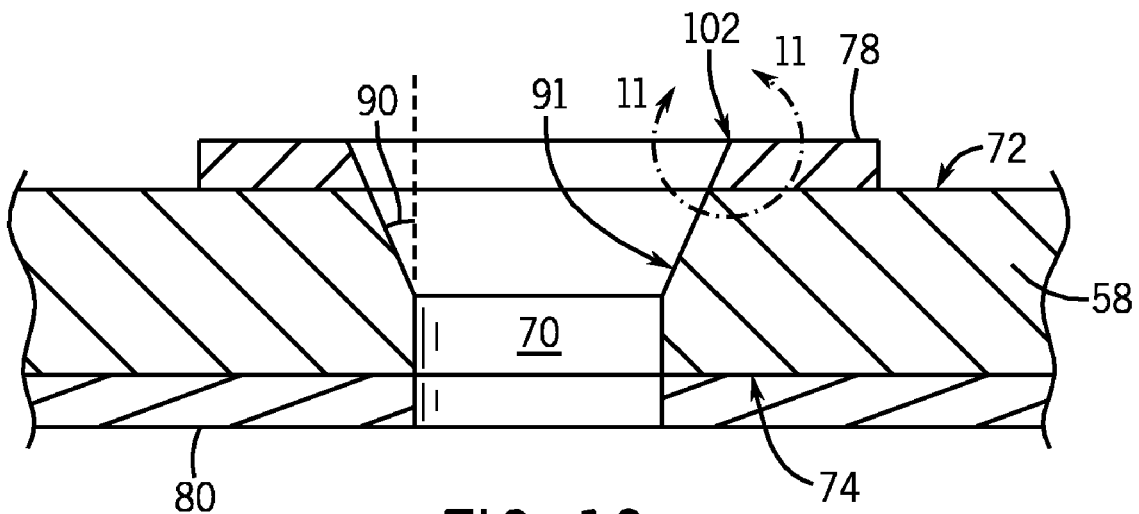
FIG. 10 is a cross-sectional view of the dilution hole taken along cut-line 6-6 of FIG. 5, in accordance with yet another embodiment of the present technique.

Referring to FIG. 10, a cross-sectional view of yet another embodiment of a TBC dilution hole 70 along cut-line 6-6 of FIG. 5 is illustrated. As shown in FIG. 10, cold-side 72 of the transition piece 58 may include a chamfer 91 having an angle 90 that is relatively small compared to the chamfer 91 illustrated in the previous embodiments (FIGS. 7-9). As will be appreciated, in a manufacturing context, the application of TBC 78 to the chamfered surface may become increasing challenging and costly as the angle 90 of the chamfer 91 decreases. By way of example, the chamfer 91 in the present embodiment may be 15 degrees or less. Thus, in the present embodiment, the TBC 78 may be applied to cover the cold-side 72 surface, but not the chamfered surface 91. In other embodiments, the TBC 78 may be applied to a portion, but not all, of the chamfered surface 91. Additionally, the innermost edge 102 of the TBC 78 may be blended with the chamfered surface 91. By way of example, the innermost edge 102 of the TBC 78 may be angled such that the chamfered surface 91 and the innermost edge 102 are both generally parallel and continuous. That is, the angle of the innermost edge 102 may be equal to the angle 90 of the chamfer 91.

Figure 11:
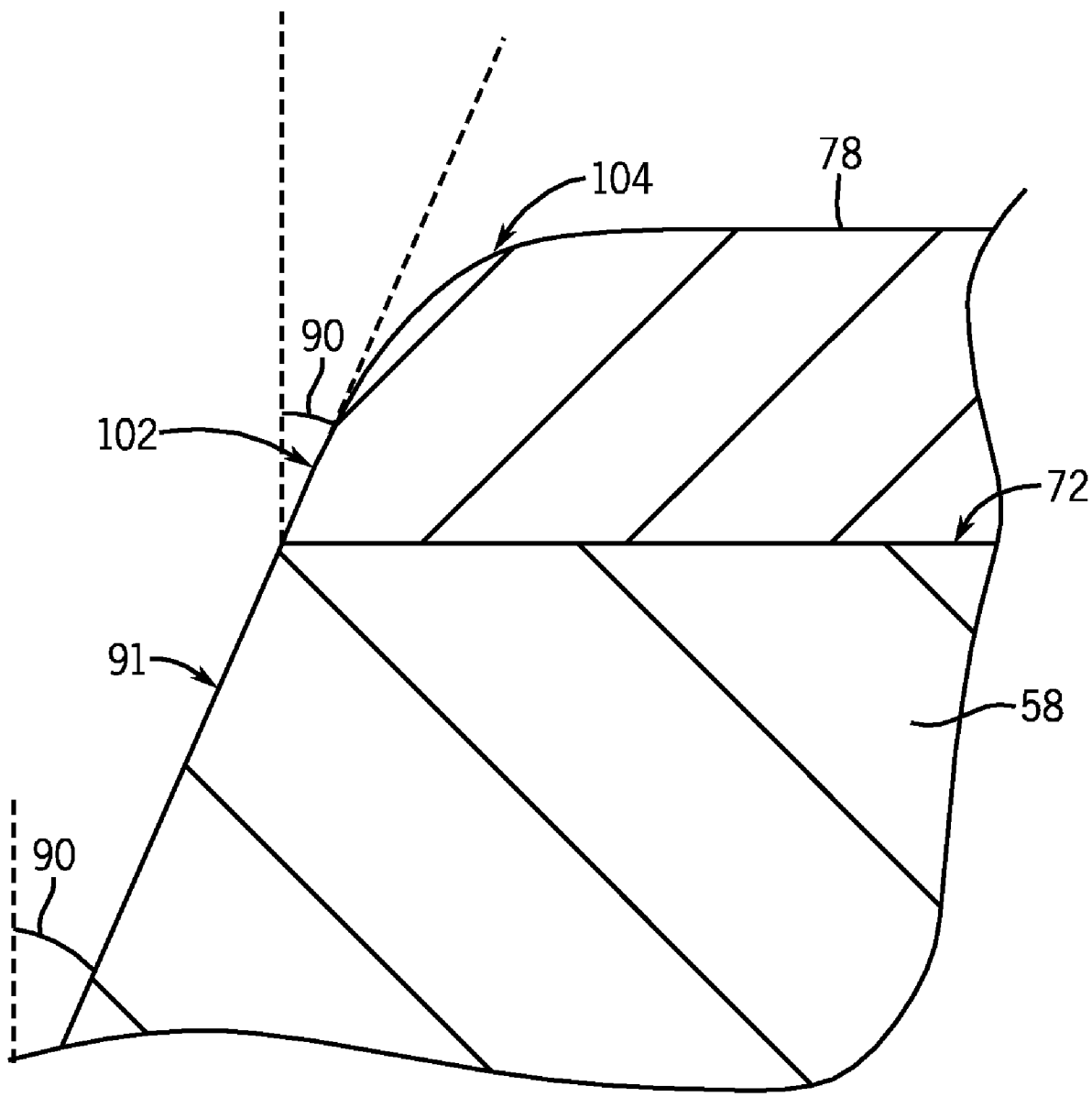
FIG. 11 is a partial cross-sectional view showing an embodiment of a TBC that may be applied to the dilution hole within the region defined by arcuate line 11-11, as shown in FIG. 10.

Referring to FIG. 11, a more detailed close-up view of the blended edge 102 of the TBC 78 within the region defined by arcuate 11-11 of FIG. 10 is illustrated. As shown, the angle of the innermost edge 102 of the TBC 78 may be equal to the angle 90 of the chamfer 91. Further, the TBC 78 may also include a generally rounded edge 104, which may further help improve fluid dynamics and reduce boundary layer separation with respect to the flow of dilution air into the dilution hole 70. Before continuing, it should be noted that while the above-described embodiments disclose chamfers having generally straight, conical, or flat surfaces, in some embodiments, the chamfers 91 around the entry-side openings 81 of the dilution holes 70 may also be curved or rounded. For instance, the chamfer 91 may gradually curve (e.g., a gradually changing angle) into the entry-side opening 81. Also, while the above-described embodiments generally describe TBC dilution holes 70 being arranged on a transition piece 58 of a combustor 16, it should be appreciated that the TBC dilution holes 70 may also be provided on the combustor liner 42.

The cold-side TBC 78, as well as the hot-side TBC 80, may be applied using any suitable thermal barrier coating application techniques. For instance, the TBC 78 may be applied to the cold side 72 of the transition piece 58 in the following manner. Initially, a mask is applied to the cold side 72 of the transition piece 58, such that only sections on the surface of the cold side 72 to which the TBC 78 is to be applied are exposed. For instance, the mask may leave only sections that circumscribe the entry-side openings 81, which may be chamfered or non-chamfered, of the dilutions holes 70 exposed. Once the mask is applied, the transition piece 58 may be heated (e.g., in an oven) to a suitable temperature (e.g., typically 200-800 degrees Fahrenheit) for applying a bond coating material to the exposed sections of the transition piece 58. Additionally, for embodiments in which a TBC (e.g., 80) is also applied to the hot-side 74 of the transition piece 58, a bond coating may also be applied on the hot-side 74 concurrently with the application of the bond coating on the cold-side 72.

Once the bond coating is applied, the transition piece 58 may remain heated for a period of time, which may be approximately 5 to 30 minutes, depending on the type of bond coating used and/or TBC that is to be applied. Thereafter, using any of the suitable application techniques discussed above (e.g., APS, ESAVD, EB-PVD, direct vapor deposition, etc.), TBC may be applied to the transition piece 58 on the sections to which the bond coating has been applied. For instance, the TBC 78 may be applied to the exposed (e.g., unmasked) sections of the cold-side 72, and the TBC 80 may be applied to the entire hot-side 74 or only a portion of the hot-side 74. Thereafter, the heat applied to the transition piece 58 may be gradually decreased over a period of approximately 30 minutes to 2 hours, for example. Subsequently, the TBC may be further manipulated in accordance with particular embodiments. For instance, in the embodiment of FIG. 8, a portion of the TBC 78 may be removed to provide the separation distance 96 around the entry-side opening 81 of the dilution hole 70. In the embodiment of FIG. 9, a portion of the TBC 78 may be removed to provide a varying thickness along a chamfered edge. Further, with regard to the embodiment shown in FIGS. 10 and 11, a portion of the TBC 78 may be removed to provide an angled innermost edge 102 and/or a rounded edge 104.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a turbine engine comprising:
   a transition section comprising a generally annular transition piece having
   a plurality of dilution holes extending radially through the annular transition piece with respect to a longitudinal axis of the transition piece, wherein each of the plurality of dilution holes comprises:
   an entry-side opening on a cold-side of the transition piece;
   an exit-side opening on a hot-side of the transition piece; and
   a section of thermal barrier coating (TBC) having a thickness and an innermost edge, wherein the TBC is applied on the cold-side and the innermost edge generally circumscribes the entry-side opening.

2. The system of claim 1, wherein each section of TBC is discrete and limited in surface area to reduce heat transfer in a vicinity of each dilution hole.

3. The system of claim 1, wherein the entry-side opening comprises a chamfer.

4. The system of claim 3, wherein the chamfer comprises an angle that is between approximately 15 to 75 degrees with respect to a radial axis of the transition piece.

5. The system of claim 1, wherein the TBC applied on the cold-side has the thickness of between approximately 0.02 to 1.6 millimeters.

6. The system of claim 1, wherein the TBC applied on the cold-side comprises yttria-stabilized zirconia (YSC), platinum aluminide, or nickel-cobalt, or some combination thereof.

7. The system of claim 1, comprising another layer of TBC applied on the hot-side of the transition piece.

8. The system of claim 7, wherein the TBC applied on the hot-side has a hot-side thickness of between approximately 0.02 to 1.6 millimeters.

9. The system of claim 1, wherein the transition piece has a transition piece thickness of between approximately 0.1 to 1.6 millimeters.

10. A system comprising:
    a combustor wall comprising:
    a cold-side;
    a hot-side; and
    a plurality of dilution holes passing through the combustor wall, wherein each dilution hole comprises an entry-side opening on the cold-side and an exit-side opening on the hot-side, each dilution hole comprises a chamfer about the entry-side opening, and each dilution hole comprises a discrete thermal barrier coating (TBC) applied on the cold-side, wherein each discrete TBC comprises a thickness and a generally circular shape having an opening with an innermost edge that generally circumscribes the entry-side opening of a respective dilution hole.

11. The system of claim 10, wherein each dilution hole has a diameter between approximately 5 to 70 millimeters.

12. The system of claim 10, wherein the generally circular shape of each discrete TBC has an outer diameter that is between approximately 1.5 to 3 times a hole diameter of the respective dilution hole.

13. The system of claim 10, wherein each discrete TBC covers at least a portion of the chamfer on the entry-side opening of a respective dilution hole.

14. The system of claim 10, wherein each discrete TBC has a separation distance between an innermost edge of the discrete TBC and the entry-side opening of a respective dilution hole.

15. The system of claim 10, wherein the thickness of each discrete TBC has a variable thickness.

16. The system of claim 10, wherein each discrete TBC has a conical surface leading into the entry-side opening of a respective dilution hole.

17. The system of claim 16, wherein each discrete TBC has a curved surface that gradually curves into the entry-side opening of a respective dilution hole.

18. A system comprising:
    an engine wall comprising a cold-side, a hot-side, and one or more dilution holes,
    wherein each of the one or more dilution holes comprises:
    a first opening on the cold-side;
    a second opening on a hot-side;
    a section of thermal barrier coating (TBC) having a thickness and an innermost edge, wherein the TBC is applied on the cold-side, and the innermost edge forms an opening that generally circumscribes the first opening.

19. The system of claim 18, wherein the first opening of each of the one or more dilution holes comprises a chamfer, and wherein the section of TBC applied on the cold-side at least partially covers the chamfer.

* * * * *